Feb. 12, 1935. F. W. JARVIS 1,990,828
CONTROL FOR MOTOR VEHICLES
Filed Oct. 24, 1932 3 Sheets-Sheet 1

INVENTOR:
FRANKLIN W. JARVIS.
BY
ATTORNEY.

Feb. 12, 1935.  F. W. JARVIS  1,990,828
CONTROL FOR MOTOR VEHICLES
Filed Oct. 24, 1932  3 Sheets-Sheet 2

INVENTOR:
FRANKLIN W. JARVIS.
BY
ATTORNEY.

Feb. 12, 1935. F. W. JARVIS 1,990,828
CONTROL FOR MOTOR VEHICLES
Filed Oct. 24, 1932   3 Sheets-Sheet 3

INVENTOR:
FRANKLIN W. JARVIS.
BY
ATTORNEY.

Patented Feb. 12, 1935

1,990,828

UNITED STATES PATENT OFFICE 1,990,828

CONTROL FOR MOTOR VEHICLES

Franklin W. Jarvis, Oakland, Calif.

Application October 24, 1932, Serial No. 639,240

6 Claims. (Cl. 192—1)

This invention relates to improvements in controls for motor vehicles and more particularly to a combined brake and throttle control.

The principal object of the invention is to control both the engine throttle and the brakes by the selective operation of a single pedal.

Another object is to arrange the apparatus to enable the operator's foot to assume proper positions for the effective performance of the braking and accelerating operations.

Another object is to render the control responsive to instinctive operation.

Another object is to increase the length of the braking stroke of the pedal.

Another object is to minimize the physical exertion required for operation of the control.

A further object is to render the control unit inexpensive and compact in design and reliable in operation.

Other objects and advantages will appear as the description progresses.

In this specification and the accompanying drawings, the invention is disclosed in its preferred form. It is however, to be understood that the invention is not limited to this form because it may be embodied in other forms without departing from the spirit of the invention as defined in the claims following the description.

In the accompanying three sheets of drawings.

Figure 1:
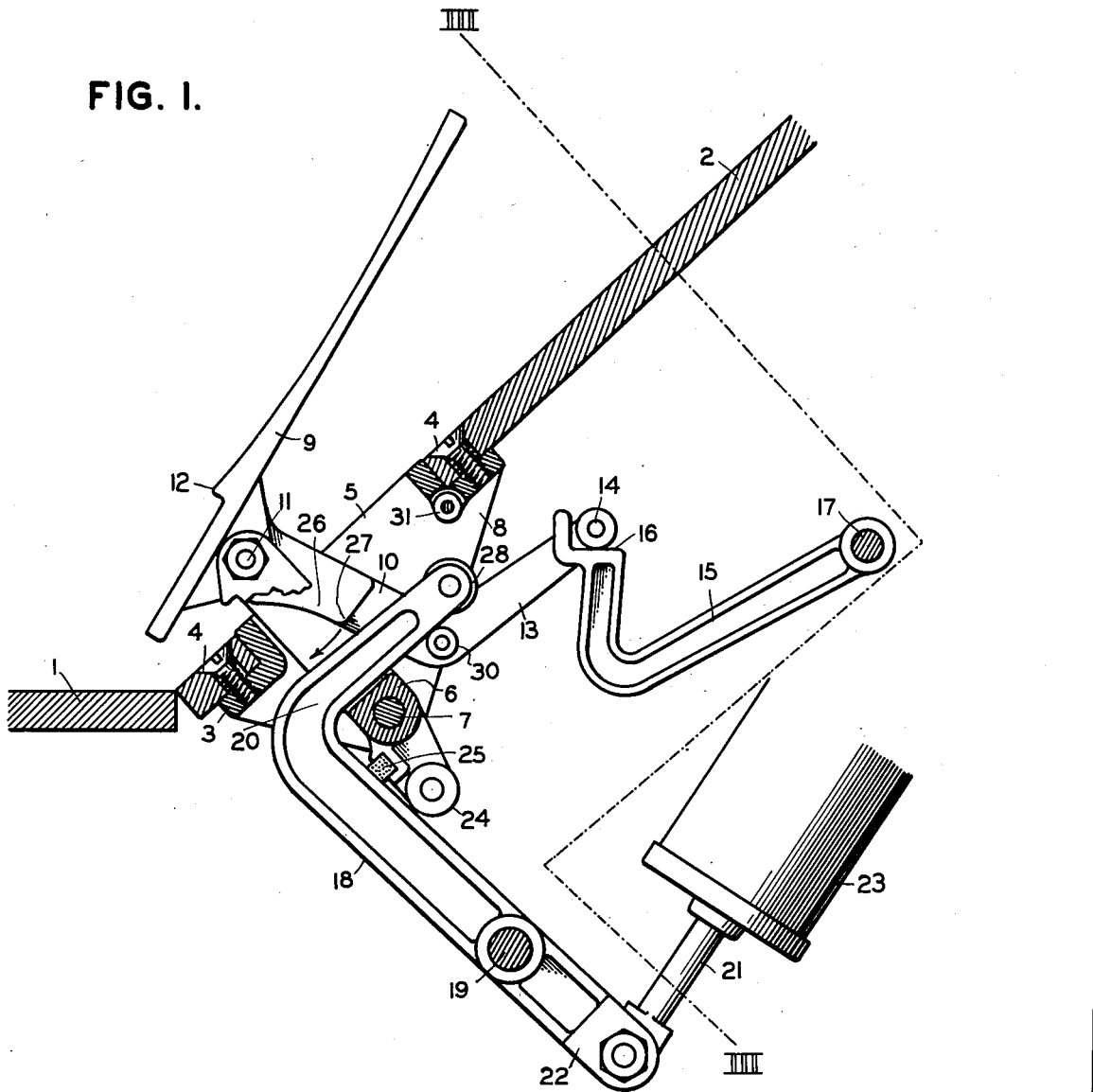
Fig. 1 is a side elevation partly in vertical section of a control unit constructed in accordance with this invention.
Figure 2:
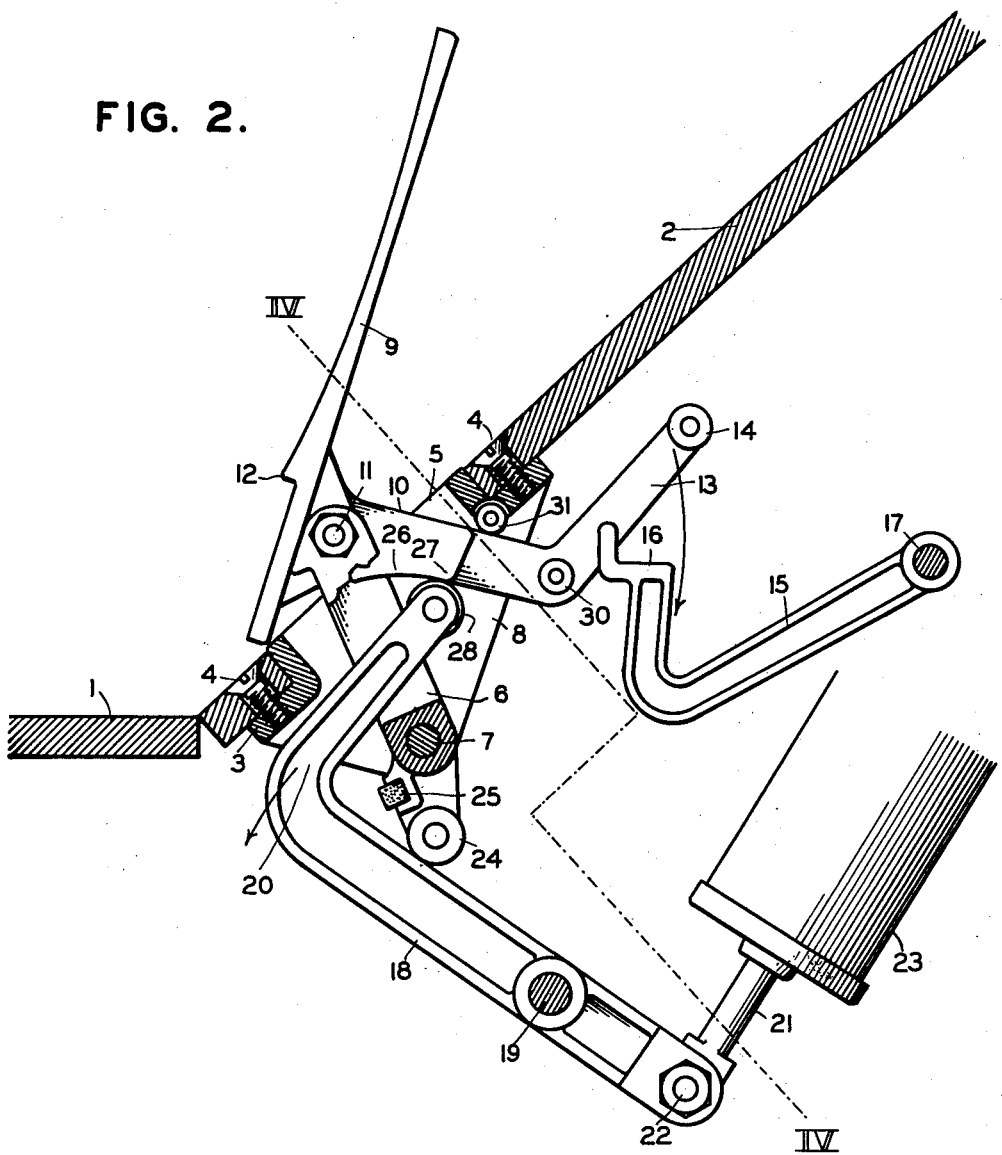
Fig. 2 is a similar view of the same in position for braking.

In detail, the construction illustrated in the drawings, referring more particularly to Figs. 1 and 2, comprises the usual horizontal floor board 1 with the inclined foot board 2 rising from the front end thereof. The bracket 3 is secured to the foot board 2 by the screws 4—4 and has the central opening 5 therethrough.

The lever 6 pivots on the pin 7 mounted in the lugs 8—8 depending from opposite sides of the bracket. The pedal 9 has the arm 10 extending downwardly therefrom and pivots on the bolt 11 in the bifurcated upper end of the lever 6. The pedal 9 is shaped to conform to the foot of the operator and has the projection 12 thereon arranged to be engaged by the heel to prevent accidental displacement of the foot. The tread may be provided with a non-slip surface.

Figure 5:
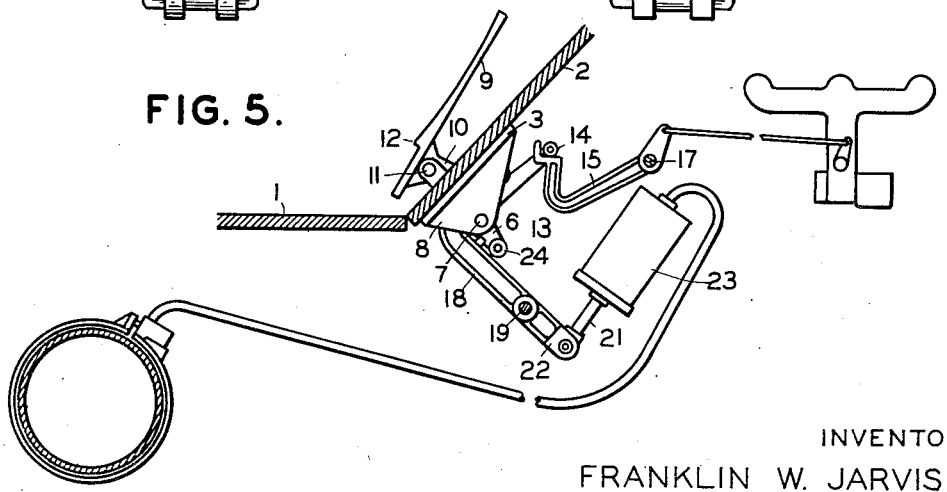
Fig. 5 is a diagrammatic view in side elevation of the control unit applied to a motor vehicle.

The arm 10 has the lateral extension 13 provided at its end with the antifriction roller 14. The lever 15 has the flat end 16 adapted to be operatively engaged by the roller 14 and is fixed on the cross rod 17 which is connected to the engine throttle as suggested in Fig. 5. The precise form of throttle control will vary with the make and model of the vehicle. If deemed necessary, the conventional accelerator button may be provided to supplement the operation of the pedal 9 by independent foot control.

The brake lever 18 is pivoted on the cross rod 19 and is bent laterally at 20 to pass through the bifurcated portion of the lever 6. The plunger 21 is mounted in the clevis 22 at the lower end of the lever 18 and extends into the hydraulic brake actuating element 23. It will be obvious to those skilled in the art that the lever 18 may be modified to operate mechanical or other braking systems without departing from the spirit of the invention.

The roller 24 is mounted on the lower end of the lever 6 in the plane of the brake lever 18 and is adapted to impinge thereon when the lever 6 is operatively swung on its pivot. The composition snubber 25 is inset in the lever 6 adjacent the roller 24 and is adapted to be enaged by the brake lever 18 to limit its movement and to absorb possible rattles between the brake lever and the lever 6.

Figure 4:
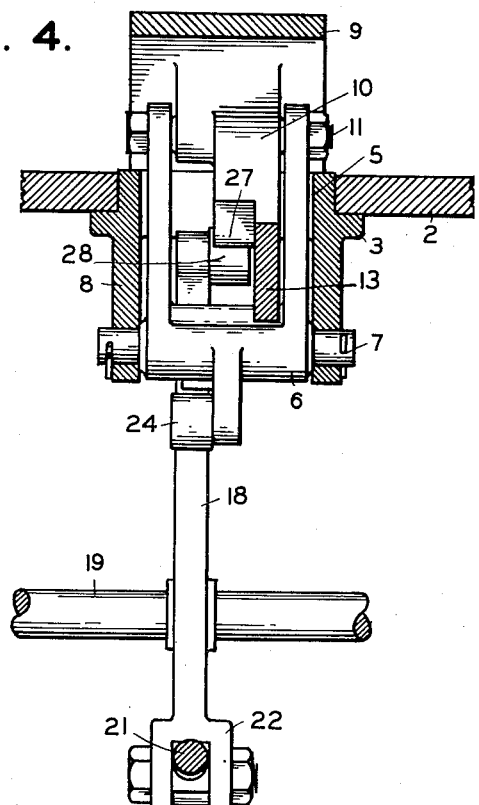
Fig. 4 is a similar view of the same in braking position taken along the line IV—IV, Fig. 2.

The cam 26 is integral with the side of the arm 10 and has the nose 27 engageable over the roller 28 extending laterally from the end of the brake lever 18 (see Figs. 2 and 4).

The resilient pressure of the brake lever 18 against the snubber 25 urges the lever 6 to assume the position shown in Fig. 1. The lower portion of the arm 10 is provided with the roller 30 which is arranged to impinge beneath the lateral extension of the brake lever to direct the roller 14 downwardly into contact with the flat end of the throttle lever 15. Additional springs may be provided to supplement the pressure of the brake lever for restoring the operating elements to the normal positions.

The roller 31 is mounted in the bracket 3 and is arranged to be engaged by the edge of the arm 10 as shown in Fig. 2 to insure against overthrow when the lever 6 is swung into braking position as later described.

Figure 3:
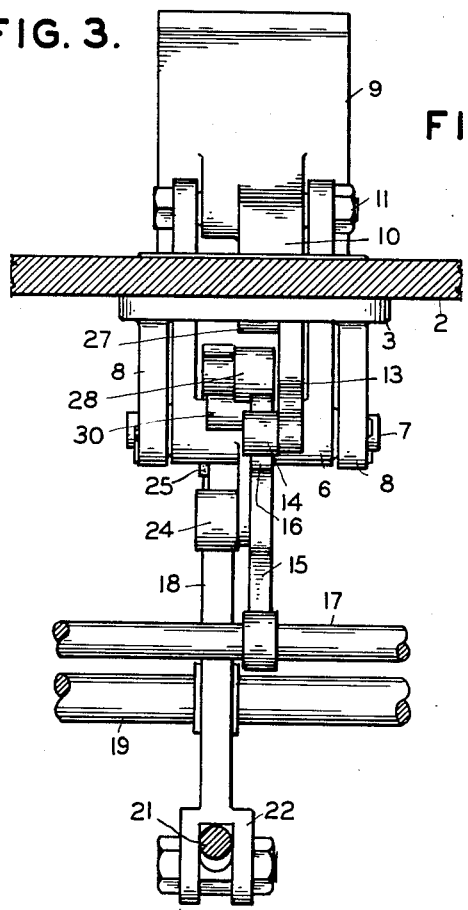
Fig. 3 is a transverse vertical section of the same taken along the line III—III, Fig. 1.

The invention operates substantially as follows: The control unit as shown in Figs. 1 and 3 is in its primary position with the roller 14 operatively engaging over the end of the throttle control lever. The toe of the pedal 9 is thus in the accelerating position and adapted to be depressed to operate the engine throttle.

To accomplish this result, the operator's foot on the pedal 9 is flexed from the ankle to depress the ball of the foot to tilt the pedal on its pivot 11. The roller 14 is forced downward against the end of the lever 15, swinging the lever and opening the engine throttle to secure the desired acceleration. The cam 26 remains disengaged throughout this movement as indicated by the arrow in Fig. 1.

It has been found preferable to locate the pedal 9 with respect to the driver's seat in the usual position of the conventional accelerator pedal. The pedal 9 should also be comfortably tilted in the position shown in Fig. 1. This enables the foot to assume the natural position for acceleration.

The control unit is advanced into the braking position shown in Fig. 2 by moving the pedal 9 straight forward by thrust of the heel. This swings the lever 6 on its pivot 7 until the nose 27 of the cam 26 engages over the roller 28 and brings the edge of the arm 10 into contact with the roller 31.

The movement of the roller 24 swings the brake lever 18 and forces the plunger 21 partially into the hydraulic pressure cylinder 23. The movement of the plunger is sufficient to take the slack out of the brake mechanism to drag the brakes without actually stopping the vehicle. The swing of the lever 18 moves the roller 28 rearwardly to cooperate with the forward movement of the arm 10 in engaging the cam nose 27 over the roller 28.

The advancing of the control unit into braking position also swings the pedal 9 on its pivot 11 raising its upper end until the pedal assumes the nearly vertical position shown in Fig. 2. This brings the upper end of the pedal closer to the body of the operator to enable a heavy foot pressure to be applied to complete the braking operation.

The swinging of the pedal 9 upon its pivot also raises the roller 14 from contact with the end of the lever 15, thus completely disengaging the control unit from the engine throttle during the braking movement.

The remainder of the braking movement is accomplished by pressing the ball of the foot against the raised upper end of the pedal 9. This forces the cam 26 against the antifriction roller 28 and further displaces the lever 18, driving the plunger 21 into the cylinder 23 to apply the brakes in the conventional manner. The cam 26 is so arranged that a gradually increasing leverage is exerted on the roller 28 as the braking movement progresses. This correspondingly increases the hydraulic pressure to insure the proper application of the brakes. The stopping of the vehicle is controlled by the pressure applied to the advanced pedal 9, the cam 26 and the lever 18, controlling the brake mechanism.

The control unit is restored to its initial position as in Fig. 1 by removing the foot pressure from the pedal 9. The usual spring tension of the brake mechanism will then restore the brake lever 18 to its normal position. The lever 6 is restored by contact of the roller 24 against the returning lever 18. This disengages the cam 26 from the roller 28 thus disconnecting the foot control unit from the brake mechanism. The roller 30 impinging beneath the lateral extension of the lever 18 depresses the arm 10 to reengage the roller 14 on the end of the throttle control lever 15.

Having thus described this invention what is claimed and desired to be secured by Letters Patent is:

1. In a motor vehicle having brake and throttle controls, a bracket, a lever pivoted on said bracket and adapted to partially operate said brake control, a pedal mounted on said lever, an arm fixed to said pedal and engageable and disengageable with said throttle control and having a cam thereon engageable with said brake control when the brake control is partially operated by said lever.

2. In a motor vehicle having brake and throttle controls, a bracket, a lever pivoted on said bracket, a pedal tiltably mounted on said lever, an arm fixed to said pedal and engaging said throttle control and disengageable therefrom when said lever is swung forward, and a cam on said arm engageable with said brake control when said lever is swung forward and said pedal is tilted upward.

3. In a motor vehicle having brake and throttle controls; a pivoted pedal having means engaging said throttle control, said pedal being longitudinally movable to disengage said means from the throttle control; means for partially operating said brake control during the longitudinal movement of said pedal; and means operable by said pedal and engageable with said brake control after the partial operation thereof during the longitudinal movement of said pedal.

4. In a motor vehicle having brake and throttle controls; a bracket; a lever pivoted on said bracket; a pedal pivoted on said lever and having means adapted to operate either of said controls when said pedal is depressed forwardly; said lever being movable in two directions to engage or completely disengage said operating means and the brake and throttle controls; and means for partially operating said brake control when said lever is moved to bring said operating means into engagement with the brake control.

5. In a motor vehicle having throttle and brake controls; a bracket; a lever mounted on said bracket and having means at its lower end adapted to partially operate said brake control; a pedal pivoted on the upper end of said lever and having means adapted to be brought into operative engagement with said brake control after the partial operation thereof by said lever; and means operative by said pedal and in engagement with said throttle control and adapted to be disengaged therefrom by the operative movement of said lever.

6. In a motor vehicle having throttle and brake controls; a bracket; a lever mounted on said bracket and adapted when moved to partially operate said brake control; a pedal mounted on said lever; an arm extending from said pedal and engaging said throttle control and disengageable therefrom by the operative movement of said lever; means on said arm adapted to operatively engage said brake control after the partial operation thereof by said lever; and a stop adapted to be contacted by said arm to limit the movement of said lever.

FRANKLIN W. JARVIS.